United States Patent
Takenaka et al.

(10) Patent No.: US 8,138,707 B2
(45) Date of Patent: Mar. 20, 2012

(54) BIPEDAL WALKING ROBOT

(75) Inventors: Kenji Takenaka, Tochigi (JP);
Yoshihisa Matsuoka, Tochigi (JP);
Satoru Ichihashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 12/445,526

(22) PCT Filed: Oct. 10, 2008

(86) PCT No.: PCT/JP2008/002877
§ 371 (c)(1),
(2), (4) Date: Apr. 14, 2009

(87) PCT Pub. No.: WO2009/054103
PCT Pub. Date: Apr. 30, 2009

(65) Prior Publication Data
US 2009/0237025 A1 Sep. 24, 2009

(30) Foreign Application Priority Data

Oct. 23, 2007 (JP) .................................. 2007-274845
Oct. 23, 2007 (JP) .................................. 2007-274846

(51) Int. Cl.
*B25J 5/00* (2006.01)
(52) U.S. Cl. ...................................... 318/568.12; 901/1
(58) Field of Classification Search ............. 318/568.11, 318/568.12, 568.22; 901/1, 8; 700/245
See application file for complete search history.

(56) References Cited

U.S. PATENT DOCUMENTS

| 6,532,400 | B1 * | 3/2003 | Jacobs | 700/245 |
| 7,023,164 | B2 * | 4/2006 | Iribe et al. | 318/563 |
| 7,053,577 | B2 * | 5/2006 | Nagasaka | 318/568.12 |
| 7,072,740 | B2 * | 7/2006 | Iribe et al. | 700/245 |
| 7,472,765 | B2 * | 1/2009 | Hayakawa et al. | 180/8.6 |
| 7,603,234 | B2 * | 10/2009 | Takenaka et al. | 700/245 |
| 7,657,345 | B2 * | 2/2010 | Endo et al. | 700/249 |
| 7,664,569 | B2 * | 2/2010 | Shimizu et al. | 700/245 |
| 7,881,824 | B2 * | 2/2011 | Nagasaka et al. | 700/260 |
| 2004/0027086 | A1 * | 2/2004 | Ogawa et al. | 318/568.12 |
| 2004/0206164 | A1 * | 10/2004 | Kawai et al. | 73/65.07 |
| 2005/0038560 | A1 * | 2/2005 | Nagasaka | 700/245 |
| 2005/0113973 | A1 * | 5/2005 | Endo et al. | 700/245 |
| 2005/0151497 | A1 * | 7/2005 | Nagasaka | 318/568.12 |

(Continued)

FOREIGN PATENT DOCUMENTS

EP  0765797  4/1997

(Continued)

*Primary Examiner* — Eduardo Colon Santana
(74) *Attorney, Agent, or Firm* — Rankin, Hill & Clark LLP

(57) ABSTRACT

Provided is a bipedal walking robot which includes a linear actuator, which connects a crus link and a foot of each leg away from an ankle joint, for driving the foot to rock around the ankle joint with respect to the crus link according to a telescopic motion thereof. The robot is capable of applying a desired moment to the foot for walking on stairs without increasing the linear actuator in size. The linear actuator is disposed in such a way that a telescopic force therefrom acts on a line inclined backward with respect to a connection line connecting a knee joint and the ankle joint. Preferably, a connection portion, which is connected to the crus link, of the linear actuator is disposed backward than from the connection line, and a connection portion, which is connected to the foot, of the linear actuator is disposed forward from the connection line.

7 Claims, 7 Drawing Sheets

U.S. PATENT DOCUMENTS

| | | | |
|---|---|---|---|
| 2005/0179416 A1* | 8/2005 | Iribe et al. | 318/563 |
| 2006/0247799 A1* | 11/2006 | Takenaka et al. | 700/54 |
| 2007/0150107 A1* | 6/2007 | Ogawa et al. | 700/245 |
| 2007/0210739 A1* | 9/2007 | Takenaka et al. | 318/568.12 |
| 2009/0171503 A1* | 7/2009 | Takenaka et al. | 700/250 |
| 2009/0312867 A1* | 12/2009 | Hasegawa et al. | 700/245 |
| 2010/0185330 A1* | 7/2010 | Kwon | 700/261 |
| 2011/0160907 A1* | 6/2011 | Orita | 700/260 |

FOREIGN PATENT DOCUMENTS

| | | |
|---|---|---|
| EP | 1081027 | 3/2001 |
| EP | 1649984 | 4/2006 |
| JP | 07-285085 | 10/1995 |
| JP | 2003-266337 | 9/2003 |
| JP | 2004-017248 | 1/2004 |
| JP | 2004-202676 | 7/2004 |

* cited by examiner

BIPEDAL WALKING ROBOT

BACKGROUND OF THE INVENTION

1. Field of the Invention

The present invention relates to a bipedal walking robot having a body and a pair of legs at both sides of the body.

2. Description of the Related Art

For a bipedal walking robot having a body and a pair of legs at both sides of the body, each leg thereof is composed of a thigh link connected to the body through a hip joint, a crus link connected to a lower end portion of the thigh link through a knee joint, and a foot connected to a lower end portion of the crus link through an ankle joint. There has been conventionally known a bipedal walking robot having a crus driving linear (translatory) actuator, which connects the thigh link and the crus link of each leg away from the knee joint, for driving the crus to rock around the knee joint, and a foot driving linear (translatory) actuator, which connects the crus link and the foot of each leg away from the ankle joint, for driving the foot to rock around the ankle joint with respect to the crus link according to a telescopic motion thereof, as disclosed, for example, in Japanese Patent Laid-open No. 2004-202676.

In this conventional bipedal walking robot, the foot driving linear (translatory) actuator is disposed backward to the crus link, in parallel to the crus link. Thereby, a telescopic force from the foot driving linear (translatory) actuator acts on a line parallel to a connection line connecting the knee joint and the ankle joint.

However, when the robot is walking on stairs, a flexion angle of the knee joint becomes greater and the crus link inclines forward greater with respect to the foot stepping on the surface of a step of the stairs. Therefore, in order to move upstairs, it is necessary for the foot driving linear (translatory) actuator to apply to the foot a greater moment in a direction declined forward around the ankle joint (declined direction of tip toes).

Herein, among the telescopic force of the foot driving linear (translatory) actuator, it is only a component in a direction orthogonal to the foot (ground surface) that contributes to the application of the moment to the foot. In the above-mentioned conventional example in which the telescopic force from the foot driving linear (translatory) actuator is applied to the line parallel to the connection line connecting the knee joint and the ankle joint, when the robot is walking on stairs, the connection line, i.e., the line of action by the telescopic force, inclines forward greater with respect to the foot. As a result, the component of the telescopic force from the foot driving linear (translatory) actuator is merely left acting on the direction orthogonal to the foot. Accordingly, it is impossible to efficiently apply the moment to the foot by the foot driving linear (translatory) actuator. In order to apply a desired moment needed to move upstairs, the foot driving linear (translatory) actuator has to be built into a large sized one with a high output.

In the conventional bipedal walking robot mentioned above, the linear (translatory) actuator for driving the crus and the linear (translatory) actuator for driving the foot are both composed of a driving unit having an electrical motor and a screw shaft driven to rotate by the electrical motor, and a slider provided with a nut member screwed to the screw shaft through a ball. The driving unit is provided with a guide frame longitudinal in a direction along a shaft line of the screw shaft (vertical direction), and the electrical motor is disposed at an upper end of the guide frame. The slider is engaged in a guide rail fixed in the guide frame in such a way that the slider can slide freely in the guide rail. The slider is configured to slide back and forth in the guide rail in the direction along the shaft line of the screw shaft by the rotation of the screw shaft.

The guide frame of the driving unit in the crus driving linear (translatory) actuator is rockably connected to the thigh link, and the slider of the crus driving linear (translatory) actuator is rockably connected to the crus link. The guide frame of the driving unit in the foot driving linear (translatory) actuator is rockably connected to the crus link, and the slider of the foot driving linear (translatory) actuator is rockably connected to the foot.

In order to improve motion performance (walking speed, responsibility) of the robot, it is necessary to decrease a moment of inertia of the thigh link and a moment of inertia of the crus link. However, in the above-mentioned conventional example, it is difficult to decrease the moment of inertia of the thigh link and the moment of inertia of the crus link. Specially, in the above-mentioned conventional example, each of the linear (translatory) actuators for driving the crus and the foot, respectively, is provided with the guide frame which is attached with the guide rail, longitudinal in the vertical direction and heavy, therefore, the center of gravity of each linear (translatory) actuator is considerably deviated downward from an upper end of the driving unit. Accordingly, although the driving unit is configured to be connected to the thigh link or the crus link so that the upper end thereof is at the same height as the joint (hip joint or knee joint) disposed at the upper end of each link, the distance between the center of gravity of each linear (translatory) actuator and the joint disposed at the upper end of each link will becomes greater. In addition, each linear (translatory) actuator becomes heavier due to the weight of the guide frame, which will make the moment of inertia around the hip joint of the thigh link and the moment of inertia around the knee joint of the crus link become considerably great.

SUMMARY OF THE INVENTION

The present invention has been accomplished in view of the aforementioned problems, and therefore a first object of the present invention is to provide a bipedal walking robot capable of applying a desired moment to a foot without increasing a linear (translatory) actuator in size, and a second object thereof is to improve motion performance of the bipedal walking robot by decreasing moments of inertia of a thigh link and a crus link.

To attain the first object described above according to the present invention, there is provided a bipedal walking robot comprising a body and a pair of legs at both sides of the body, wherein each leg is composed of a thigh link connected to the body through a hip joint, a crus link connected to a lower end portion of the thigh link through a knee joint, and a foot connected to a lower end portion of the crus link through an ankle joint, the bipedal walking robot further comprising a foot driving linear (translatory) actuator, which connects the crus link and the foot of each leg away from the ankle joint, for driving the foot to rock around the ankle joint with respect to the crus link according to a telescopic motion thereof; wherein the foot driving linear (translatory) actuator is disposed in such a way that a telescopic force therefrom acts on a line inclined backward with respect to a connection line connecting the knee joint and the ankle joint.

According to the present invention, when walking on stairs, even if the connection line connecting the knee joint and the ankle joint is greatly inclined forward with respect to the foot, the telescopic force from the foot driving linear (translatory) actuator is applied on the line inclined backward with respect to the connection line, therefore, an angle between the vector of the telescopic force and the orthogonal direction to the foot is approximately equal to a right angle. Accordingly, the component of the telescopic force from the foot driving linear (translatory) actuator orthogonal to the foot becomes greater, allowing the moment to be efficiently applied to the foot. As a result thereof, without adopting a large sized foot driving linear (translatory) actuator with a high output, the desired moment needed to move upstairs can be applied to the foot, allowing the foot driving linear (translatory) actuator to be compact sized and electrical power saving.

It is possible, of course, to dispose a connection portion, which is connected to the crus link, of the foot driving linear (translatory) actuator forward than the connection line and a connection portion, which is connected to the foot, of the foot driving linear (translatory) actuator forward than the connection portion connected to the crus link, or to dispose the connection portion, which is connected to the foot, of the foot driving linear (translatory) actuator backward than the connection line and the connection portion, which is connected to the crus link, of the foot driving linear (translatory) actuator backward than the connection portion connected to the foot. However, this will make the foot driving linear (translatory) actuator extend greatly to the front side or rear side of the crus link, deteriorating the slim looking of the leg.

In regard to this problem, by disposing a connection portion, which is connected to the crus link, of the foot driving linear (translatory) actuator backward than the connection line and a connection portion, which is connected to the foot, of the foot driving linear (translatory) actuator forward than the connection line, the extended amount of the foot driving linear (translatory) actuator toward the anteroposterior direction of the crus link becomes smaller, allowing the leg to become slim to approximate to a profile of a human's leg.

Additionally, in the above-mentioned case, it is desirable that the foot driving linear (translatory) actuator includes a ball screw mechanism composed of a driving unit having an electrical motor and a nut member driven to rotate by the electrical motor, and a screw shaft screwed to the nut member through a ball supported by the nut member; the connection portion connected to the crus link is disposed in the driving unit and the connection portion connected to the foot is disposed at a lower end of the screw shaft. According thereto, the driving unit which occupies most weight of the linear (translatory) actuator is disposed at an upper position of the linear (translatory) actuator, namely, is disposed at a position close to the knee joint. As a result thereof, the moment of inertia around the knee joint is reduced, improving the motion performance (walking speed, responsibility) of the robot.

To attain the second object described above, it is desirable that the present invention further includes a crus driving linear (translatory) actuator, which connects the thigh link and the crus link of each leg away from the knee joint, for driving the crus link to rock around the knee joint with respect to the thigh link according to a telescopic motion of the crus driving linear (translatory) actuator, in addition to the foot driving linear (translatory) actuator, wherein each of the foot driving linear (translatory) actuator and the crus driving linear (translatory) actuator includes a ball screw mechanism composed of a driving unit having an electrical motor and a nut member driven to rotate by the electrical motor, and a screw shaft screwed to the nut member through a ball supported by the nut member; the driving unit of the crus driving linear (translatory) actuator is rockably connected to the thigh link and the screw shaft thereof is rockably connected to the crus link; the driving unit of the foot driving linear (translatory) actuator is rockably connected to the crus link and the screw shaft thereof is rockably connected to the foot; a rocking shaft line of the driving unit of the crus driving linear (translatory) actuator with respect to the thigh link is orthogonal to a central shaft line of the nut member of the driving unit; and a rocking shaft line of the driving unit of the foot driving linear (translatory) actuator with respect to the crus link is orthogonal to a central shaft line of the nut member of the driving unit.

According thereto, the guide frame in the conventional example, which is attached with the guide rail for guiding the slider, longitudinal in the vertical direction and heavy, becomes unnecessary in the present invention. As a result thereof, the position of the center of gravity of the linear (translatory) actuator approximates to the upper end of the driving unit, allowing the distance between the center of gravity of the linear (translatory) actuator and the joint portion (the hip joint or the knee joint) at the upper end of the thigh link or the crus link to be shortened. Moreover, by getting rid of the heavy guide frame, the weight of the linear (translatory) actuator becomes light, which helps to reduce the moment of inertia around the joint portion at the upper end of the thigh link or the crus link. Resultantly, the motion performance of the bipedal walking robot is improved.

When disposing the nut member in the driving unit, if the rocking shaft line of the driving unit with respect to the thigh link or the crus link offsets from the line orthogonal to the central shaft line of the nut member, the driving unit will rock around the rocking shaft line offset from the shaft line of the screw shaft according to the back and forth motions of the screw shaft, which exerts a bending load on the screw shaft. In order to absorb the bending load, it is necessary to support the nut member by a linear guide in a floating way. Whereas, if the rocking shaft line of the driving unit with respect to the thigh link or the crus link is disposed orthogonal to the central shaft line of the nut member, the screw shaft will not be subjected to the bending load. Therefore, the linear guide is unnecessary, and accordingly, the linear (translatory) actuator can be made lighter. As a result thereof, the moment of inertia of the thigh link or the crus link can be reduced.

It is preferable that the driving unit of each of the linear (translatory) actuators is provided with a mount frame for mounting thereon the electrical motor and a nut case for rockably housing the nut member; the nut case and the electrical motor are disposed in parallel on the mount frame, and the driving unit is rockably connected to the thigh link or the crus link around the rocking axis in the nut case. Herein, it is also possible to dispose the nut case beneath the electrical motor and house the nut member in the nut case in a way that the nut member can rotate freely. However, this will make the driving unit become longer in the vertical direction, which lowers the center of gravity of the linear (translatory) actuator accordingly. In regard to this problem, by disposing the nut case in parallel to the electrical motor as mentioned above, the length of the driving unit in the vertical direction becomes shorter, and this will make the center of gravity of the linear (translatory) actuator higher. Consequently, the moment of inertia of the thigh link or the crus link can be further reduced.

Furthermore, by rockably connecting the driving unit of the crus driving linear (translatory) actuator to the thigh link with the shaft line thereof identical to a joint shaft line of the hip joint, and the driving unit of the foot driving linear (translatory) actuator to the crus link with the shaft line thereof identical to a joint shaft line of the knee joint, the moment of inertia of the thigh link or the crus link can be further reduced.

DETAILED DESCRIPTION OF THE PREFERRED EMBODIMENTS

Figure 1:
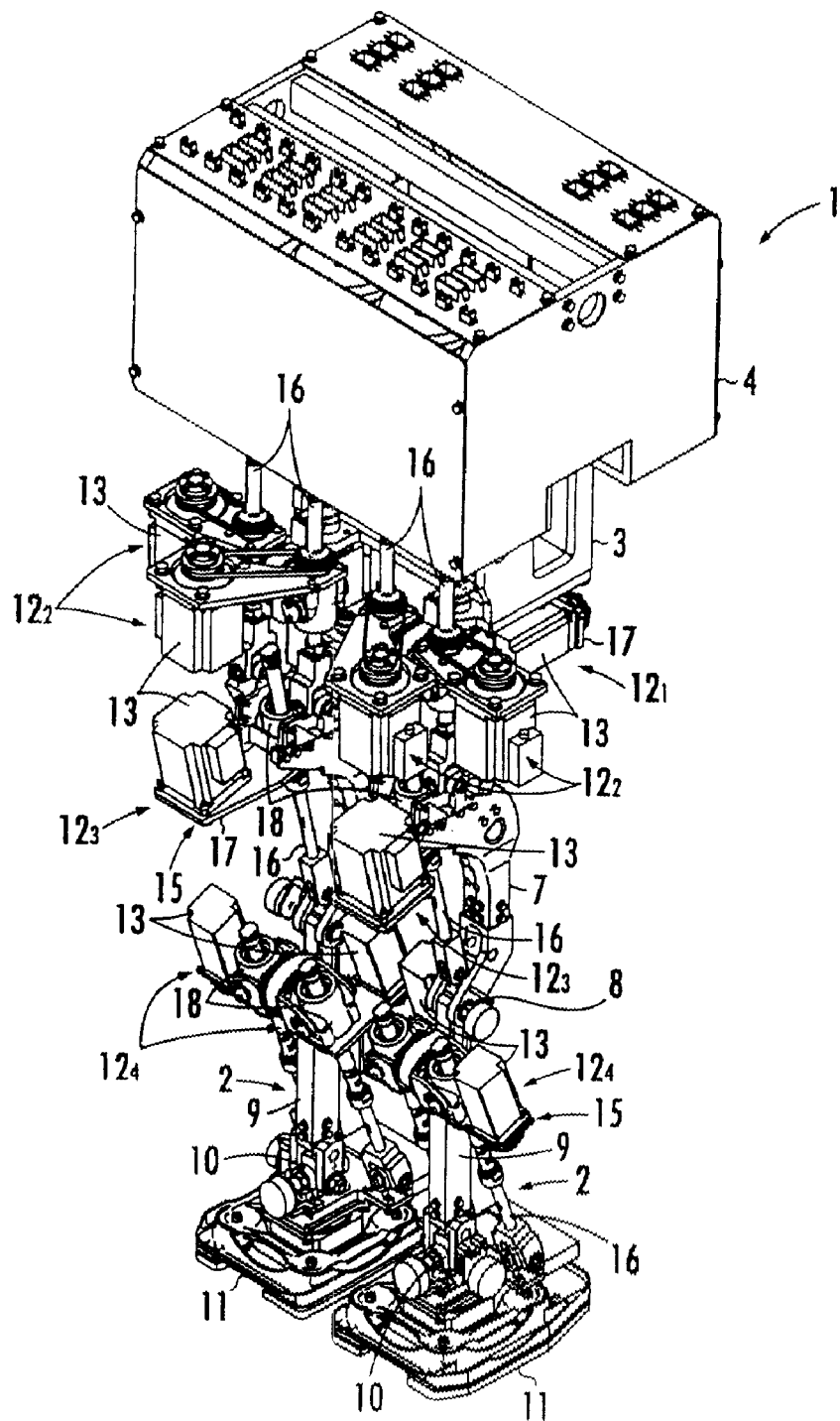
FIG. 1 is a rear perspective view of a bipedal walking robot according to an embodiment of the present invention.
Figure 2:
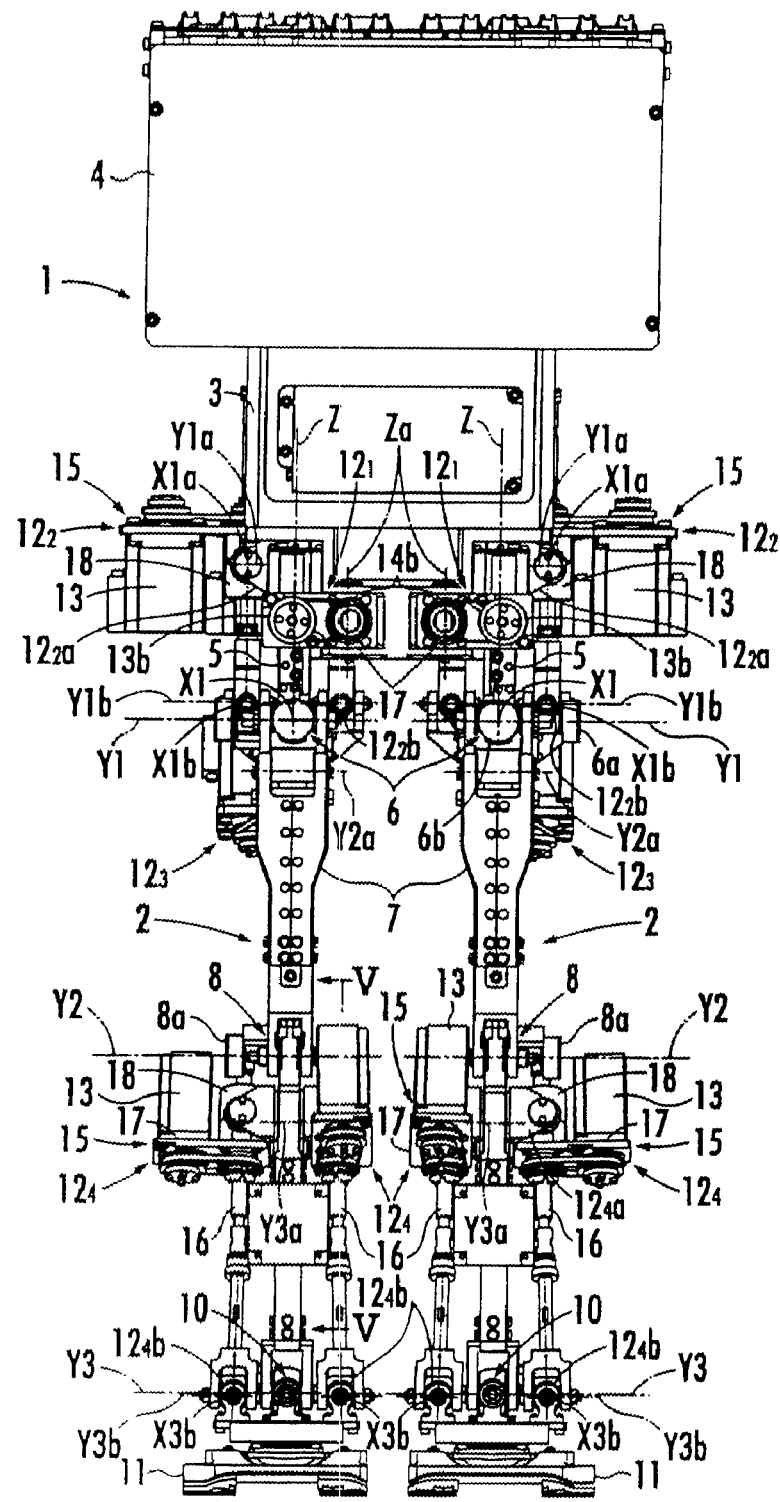
FIG. 2 is a front view of the bipedal walking robot according to an embodiment of the present invention.
Figure 3:
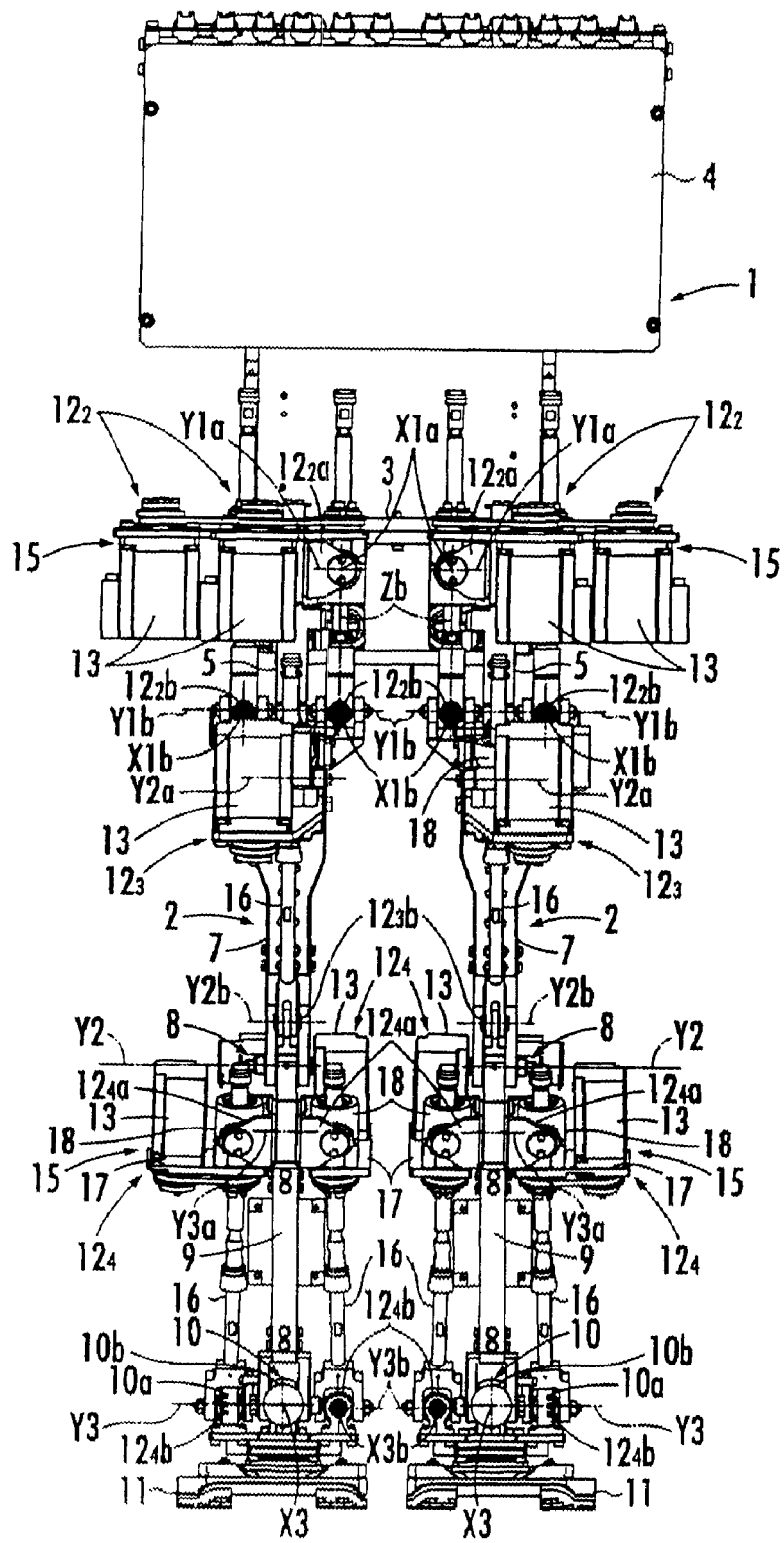
FIG. 3 is a rear view of the bipedal walking robot according to an embodiment of the present invention.
Figure 4:
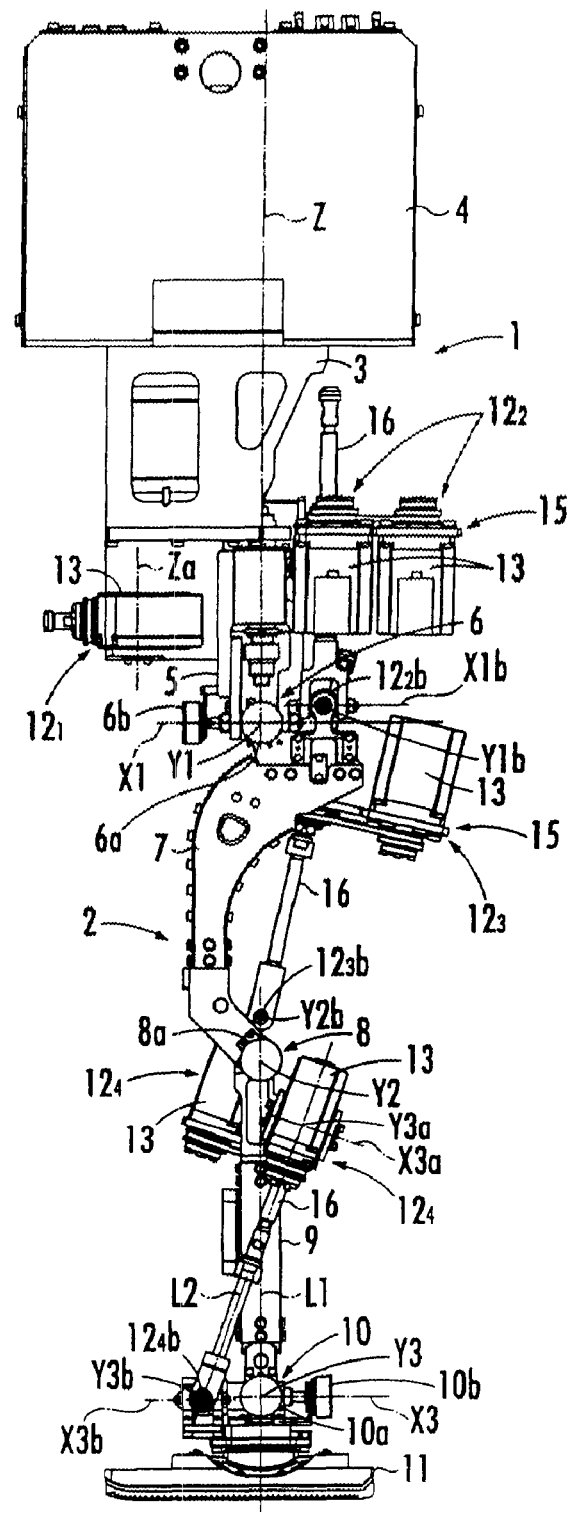
FIG. 4 is a side view of the bipedal walking robot according to an embodiment of the present invention.

A bipedal walking robot according to an embodiment of the present invention is illustrated in FIG. 1 to FIG. 4. The bipedal walking robot includes a body 1 and a pair of legs 2 and 2 at both sides of the body 1. The body 1 is provided with a body frame 3. A control box 4 is mounted on the body frame 3. The body frame 3 is disposed side by side with a pair of rotation yokes 5 and 5 which are connected by a pair of legs 2 and 2, respectively. The rotation yoke 5 can freely rotate around a vertical axis (Z axis).

Each leg 2 is composed of a thigh link 7, a crus link 9 and a foot 11. The thigh link 7 is connected to a lower end of each rotation yoke 5 of the body 1 through a hip joint 6. The crus link 9 is connected to a lower end of the thigh link 7 through a knee joint 8. The foot 11 is connected to a lower end of the crus link 9 through an ankle joint 10.

The hip joint 6 is configured as a 2-axis joint having a rotation degree around 2 axes of a lateral axis (Y1 axis) and an anteroposterior axis (X1 axis) which are orthogonal to the Z axis. Therefore, the thigh link 7 can freely rock around the Y1 axis in the anteroposterior direction and around the X1 axis in the lateral direction with respect to the rotation yoke 5. The hip joint 6 is disposed with encoders 6a and 6b for detecting a rocking angle of the thigh link 7 rocked around the Y1 axis and the X1 axis, respectively.

The knee joint 8 is configured as a 1-axis joint having a rotation degree around a lateral axis (Y2 axis). Therefore, the crus link 9 can freely rock around the Y2 axis in the anteroposterior direction with respect to the thigh link 7. The knee joint 8 is disposed with an encoder 8a for detecting a rock angle of the crus link 9 around the Y2 axis.

The ankle joint 10 is configured as a 2-axis joint having a rotation degree around 2 axes of a lateral axis (Y3 axis) and an anteroposterior axis (X3 axis) which is orthogonal to the Y3 axis. Therefore, the foot 11 can freely rock around the Y3 axis in the vertical direction and around the X3 axis in the lateral direction with respect to the crus link 9. The ankle joint 10 is disposed with encoders 10a and 10b for detecting a rock angle of the foot 11 around the Y3 axis and the X3 axis, respectively.

The bipedal walking robot according to the present embodiment is provided with a first linear (translatory) actuator $12_1$ away from the Z axis, a pair of laterally arranged second linear (translatory) actuators $12_2$ and $12_2$ away from the hip joint 6, a third linear (translatory) actuator $12_3$ away from the knee joint 8, and a pair of laterally arranged fourth linear (translatory) actuators $12_4$ and $12_4$ away from the ankle joint 10. The first linear (translatory) actuator $12_1$ connects the body frame 3 and each rotation yoke 5. The second linear (translatory) actuators $12_2$ and $12_2$ connect each rotation yoke 5 and the thigh link 7 of each leg 2. The third linear (transla-tory) actuator $12_3$, which connects the thigh link 7 and the crus link 9 of each leg 2. The fourth linear (translatory) actuators $12_4$ and $12_4$ connect the crus link 9 and the foot 11 of each leg 2.

The rotation yoke 5 rotates around the Z axis according to a telescopic motion of the first linear (translatory) actuator $12_1$. The thigh link 7 rocks in the anteroposterior direction around the Y1 axis of the hip joint 6 when the pair of second linear (translatory) actuators $12_2$ and $12_2$ extend or contract together, and rocks in the lateral direction around the X1 axis of the hip joint 6 when one actuator of the pair of second linear (translatory) actuators $12_2$ and $12_2$ extends and the other one contracts at the same time. The crus link 9 rocks in the anteroposterior direction around the Y2 axis of the knee joint 8 according to a telescopic motion of the third linear (translatory) actuator $12_3$. The foot 11 rocks in the vertical direction around the Y3 axis of the ankle joint 10 when the pair of fourth linear (translatory) actuators $12_4$ and $12_4$ extend or contract together, and rocks in the lateral direction around the X3 axis of the ankle joint 10 when one actuator of the pair of fourth linear (translatory) actuators $12_4$ and $12_4$ extends and the other one contracts at the same time.

Figure 5:
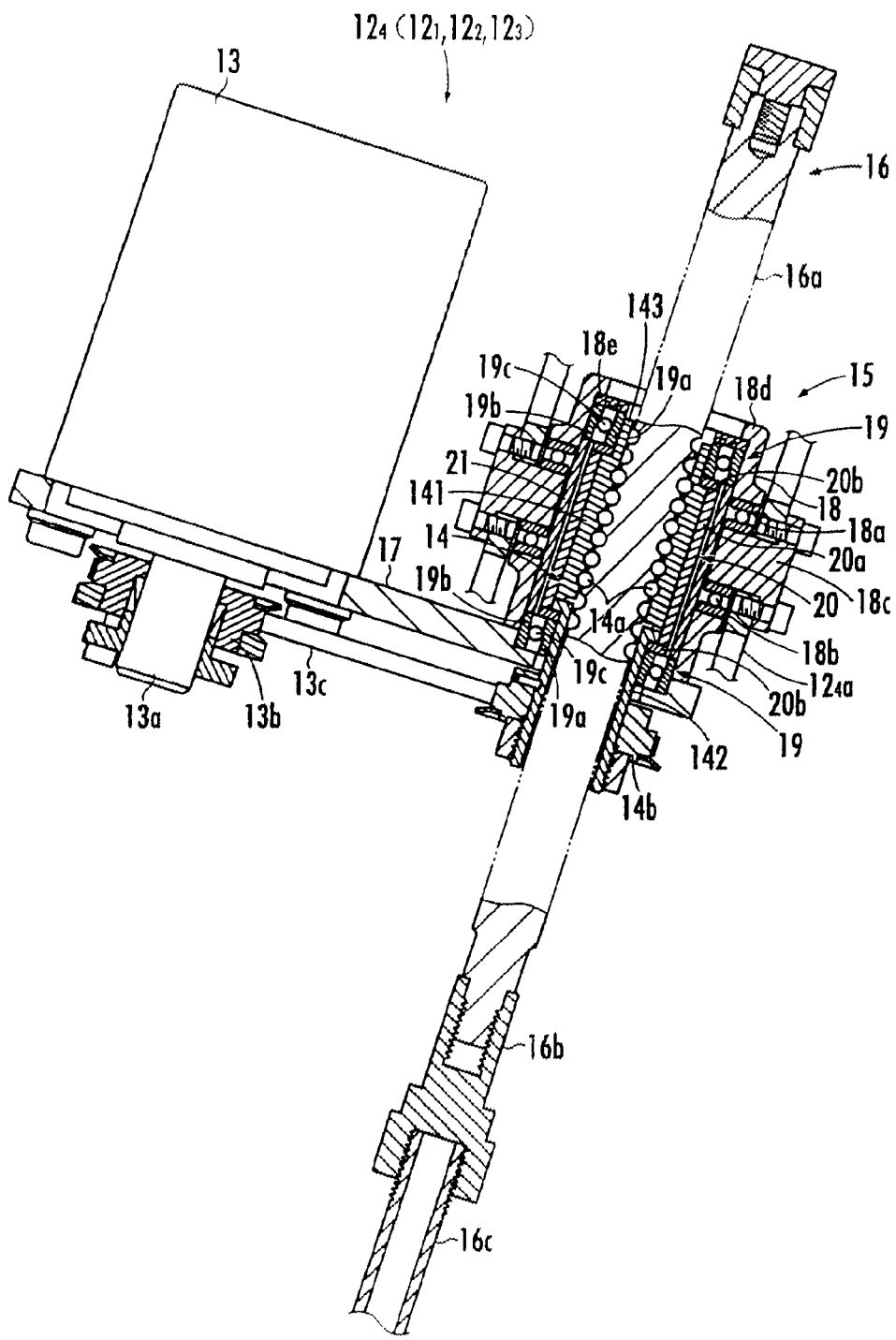
FIG. 5 is an enlarged sectional view of the bipedal walking robot in FIG. 2 cutaway from a V-V line.

As illustrated in FIG. 5, each of the linear (translatory) actuators $12_1$, $12_2$, $12_3$ and $12_4$ is composed of a ball screw mechanism having a driving unit 15 and a screw shaft 16. The driving unit 15 is composed of an electrical motor 13 and a nut member 14 driven to rotate by the electrical motor 13. The screw shaft 16 is screwed to the nut member 14 through a ball 14a supported by the nut member 14. Each of the linear (translatory) actuators $12_1$, $12_2$, $12_3$ and $12_4$ performs telescopic motions by moving in the axial direction of the screw shaft 16 according to the rotations of the nut member 14. The screw shaft 16 is composed of a main body portion 16a formed with a thread groove on an outer circumferential surface and a rod portion 16c connected to one end of the main body portion 16a in the axial direction through a joint portion 16b. Note that the other linear (translatory) actuators $12_1$, $12_2$ and $12_3$ also have the same configuration as the fourth linear (translatory) actuator $12_4$ illustrated in FIG. 5.

The driving unit 15 is provided with a mount frame 17. The mount frame 17 is mounted thereon with the electrical motor 13 and a nut case 18 for rotatably housing the nut member 14. The electrical motor 13 and the nut case 18 are disposed in parallel. The nut member 14 is pivotally supported in the nut case 18 through a pair of angular bearings 19 and 19. An output shaft 13a of the electrical motor 13, protruding from the mount frame 17, is connected with a driving pulley 13b and an end portion of the nut member 14, protruding from the mount frame 17, is connected with a follower pulley 14b. A belt 13c is covered across the two pulleys 13b and 14b. Thereby, the nut member can be driven to rotate by the electrical motor 13 via the belt 13c.

The nut case 18 is formed with a gallery 18a, an axis thereof is orthogonal to the central shaft line of the nut member 14. A bearing 18b is installed in the gallery 18a. The nut case 18 is rockably supported by a shaft 18c, which will be described hereinafter, at the bearing 18b.

The driving unit 15 of the first linear (translatory) actuator $12_1$ is connected to the body frame 3 in a way of being able to rock freely in the nut case 18 around a rocking shaft line (Za axis) parallel to the Z axis. Specifically, the shaft 18c which is positioned at the Za axis is disposed at the body frame 3, and the nut case 18 is rockably supported by the shaft 18c through the bearing 18b. In this situation, the Za axis is orthogonal to the central shaft line of the nut member 14. The screw shaft 16 of the first linear (translatory) actuator $12_1$ is rockably connected to the rotation yoke 5 in a way of being able to rock freely around a rocking shaft line (Zb axis) parallel to the Z axis in the rod portion 16c.

The driving unit 15 of the second linear (translatory) actuator $12_2$ is connected to the rotation yoke 5 in a way of being able to rock freely in the nut case 18 around two shaft lines of a rocking shaft line (Y1a axis) parallel to the Y1 axis of the hip joint 6 and a rocking shaft line (X1a axis) orthogonal to the Y1a axis. Specifically, a joint member $12_2$a is pivotally attached to the rotation yoke 5 in way of being able to rotate freely around the Y1a axis. To the joint member $12_2$a, the shaft 18c positioned at the X1a axis is attached. The nut case 18 is pivotally supported at the shaft 18c through the bearing 18b in a way of being able to rock freely. In this situation, the X1a axis and the Y1a axis are both orthogonal to the central shaft line of the nut member 14. The screw shaft 16 of the second linear (translatory) actuator $12_2$ is connected to the upper end portion of the thigh link 7, which is positioned backward of the hip joint 6, in a way of being able to rock freely at the rod portion 16c around two shaft lines of a rocking shaft line (Y1b axis) which is parallel to the Y1 axis and a rocking shaft line (X1b axis) which is orthogonal to the Y1b axis. Specifically, the rod portion 16c is connected to the upper end portion of the thigh link 7 through a 2-axis joint portion $12_2$b which have a rotation degree around 2 axes of the Y1b axis and the X1b axis.

The driving unit 15 of the third linear (translatory) actuator $12_3$ is connected to the upper portion of the thigh link 7 in a way of being able to rock freely in the nut case 18 around a rocking shaft line (Y2a axis) which is parallel to the Y2 axis of the knee joint 8. Specifically, the shaft 18c which is positioned at the Y2a axis is attached to the upper portion of the thigh link 7, and the nut case 18 is pivotally supported at the shaft 18c through the bearing 18b in a way of being able to rock freely. In this situation, the Y2a axis is orthogonal to the central shaft line of the nut member 14. Moreover, the screw shaft 16 of the third linear (translatory) actuator $12_3$ is connected to the upper end portion of the crus link 9, which protrudes to the upper side of the knee joint 8, in a way of being able to rock freely at the rod portion 16c around a rocking shaft line (Y2b axis) parallel to the Y2 axis. Specifically, the rod portion 16c is connected to the upper end portion of the crus link 9 through 1-axis joint $12_3$b having a rotation degree around the Y2b axis.

The driving unit 15 of the fourth linear (translatory) actuator $12_4$ is connected to the upper portion of the crus link 9 in a way of being able to rock freely in the nut case 18 around two axes of a rocking shaft line (Y3a axis) parallel to the Y3 axis of the ankle joint 10 and a rocking shaft line (X3a axis) orthogonal to the Y3a axis. Specifically, a joint member $12_4$a is pivotally fixed to the upper portion of the crus link 9 in a way of being able to rock free around the Y3a axis. To the joint member $12_4$a, the shaft 18c which is positioned at the X3a axis is attached. The nut case 18 is pivotally supported at the shaft 18c through the bearing 18b in a way of being able to rock freely. In this situation, the X3a axis and the Y3b axis are both orthogonal to the central shaft line of the nut member 14. Moreover, the screw shaft 16 of the fourth linear (translatory) actuator $12_4$ is connected to the foot 11 in a way of being able to rock freely at the rod portion 16c around two axes of a rocking shaft line (Y3b axis) parallel to the Y3 axis and a rocking shaft line (X3b axis) orthogonal to the Y3b axis. Specifically, the rod portion 16c is connected to the foot 11 through a 2-axis joint $12_4$b having a rotation degree around two axes of the Y3b axis and the X3b axis.

Each fourth linear (translatory) actuator $12_4$ is disposed in such a way that the telescopic force from each fourth linear (translatory) actuator $12_4$ acts on a line L2 inclined backward with respect to a connection line L1 connecting the Y2 axis of the knee joint 8 and the Y3 axis of the ankle joint 10. Specifically, a connection portion, which is connected to the crus link 9, of each fourth linear (translators) actuator $12_4$ is disposed backward than the connection line L1 and a connection portion, which is connected to the foot 11, of each fourth linear (translatory) actuator $12_4$ is disposed forward than the connection line L1. Herein, the telescopic force from the fourth linear (translatory) actuator $12_4$ acts on a connection line between the Y3a axis and the Y3b axis in a sagittal plane. Therefore, by disposing the Y3a axis and the Y3b axis as mentioned above, the action line L2 of the telescopic force from the fourth linear (translatory) actuator $12_4$ is inclined backward the connection line L1.

In the pair of the fourth linear (translatory) actuators $12_4$ of each leg 2, the driving unit 15 of the fourth linear (translatory) actuator $12_4$ disposed at the outer side of the crus link 9 in the lateral direction is arranged in a way that the electrical motor 13 thereof is located at the outer side of the nut case 18 in the lateral direction. On the other hand, the driving unit 15 of the other fourth linear (translatory) actuator $12_4$ is arranged in a way that the electrical motor 13 thereof is located at the front side of the nut case 18 so as to prevent it from interfering with the driving unit 15 of the fourth linear (translatory) actuator $12_4$ disposed at the inner side of the crus link 9 of the other leg 2 in the lateral direction.

It is also conceivable to constitute each of the third linear (translatory) actuator $12_3$ for driving the crus and the fourth linear (translatory) actuator $12_4$ for driving the foot as a ball screw mechanism which is composed of a driving unit having an electrical motor and a screw shaft driven to rotate by the electrical motor, and a slider having a nut member screwed to the screw shaft. However, for the mentioned linear (translatory) actuators, it is necessary to provide a guide frame which is attached with a guide rail for guiding the slider, longitudinal in the vertical direction and heavy; due to the affection of the guide frame, the center of gravity of each linear (translatory) actuator is deviated considerably down from an upper end of the driving unit. Accordingly, although the driving unit is configured to be connected to the thigh link 7 or the crus link 9 in a way that an upper end thereof is at the same height as the joint (hip joint or knee joint) disposed at the upper end of each of the links 7 and 9, the distance between the center of gravity of each linear (translatory) actuator and the joint disposed at the upper end of each link 7 and 9 will becomes greater. In addition, each linear (translatory) actuator becomes heavier due to the weight of the guide frame, which will make the moment of inertia around the hip joint 6 of the thigh link 7 and the moment of inertia around the knee joint 8 of the crus link 9 become considerably great.

In regard to this problem, in the present embodiment, the driving unit 15 of each of the linear (translatory) actuators $12_3$ and $12_4$ is provided with the nut member 14 driven to rotate by the electrical motor 13, and the screw shaft 16 screwed to the nut member 14 is made to move back and forth according to the rotations of the nut member 14. Therefore, the guide frame which is attached with the guide rail for guiding the above-mentioned slider, longitudinal in the vertical direction and heavy is not needed any more. Consequently, the center of gravity of each of the linear (translatory) actuators $12_3$ and $12_4$ approximates to the upper end of the driving unit 15, which enables the distance between the joint portion (the hip joint 6 and the knee joint 8) at the upper end of the thigh link 7 or the crus link 9 and the center of gravity of each of the linear (translatory) actuators $12_3$ and $12_4$ to be shortened. Moreover, since the guide frame, which is a heavy load, is not needed any more, each of the linear (translatory) actuators $12_3$ and $12_4$ becomes lighter, which enables the moment of inertia around the joint portion at the upper end of the thigh link 7 or the crus link 9 to be reduced, thereby, to improve the motion performance, such as the walking speed, the responsibility or the like, of the bipedal walking robot 2.

When disposing the nut member 14 in the driving unit 15 of each of the linear (translatory) actuators $12_3$ and $12_4$, if the rocking shaft line of the driving unit 15 with respect to the thigh link 7 or the crus link 9 offsets from the line orthogonal to the central shaft line of the nut member 14, the driving unit 15 will rock around the rocking shaft line offset from the shaft line of the screw shaft 16 according to the back and forth motions of the screw shaft 16, which exerts a bending load on the screw shaft 16. In order to absorb the bending load, it is necessary to support the nut member 14 by a linear guide in a floating way. Whereas in the present embodiment, the rocking shaft line (the Y2a axis, the Y3a axis or the X3a axis) of the driving unit 15 of each of the linear (translatory) actuators $12_3$ and $12_4$ with respect to the thigh link 7 or the crus link 9 is disposed orthogonal to the central shaft line of the nut member 14, the screw shaft 16 will not be subjected to the bending load. Therefore, the linear guide is unnecessary, and accordingly, the linear (translatory) actuators $12_3$ and $12_4$ can be made lighter. As a result thereof, the moment of inertia of the thigh link 7 or the crus link 9 can be reduced.

When disposing the nut member 14 in the driving unit 15 of each of the linear (translatory) actuators $12_3$ and $12_4$, it is also possible to dispose the nut case beneath the electrical motor 13 and house the nut member in the nut case in a way that the nut member can rotate freely. However, this will make the driving unit 15 become longer in the vertical direction, which lowers the center of gravity of each of the linear (translatory) actuators $12_3$ and $12_4$ accordingly. In regard to this problem, by disposing the nut case 18 in parallel to the electrical motor 13 as mentioned above in the present embodiment, the length of the driving unit 15 in the vertical direction becomes shorter, and this will make the center of gravity of each of the linear (translatory) actuators $12_3$ and $12_4$ higher. Consequently, the moment of inertia of the thigh link 7 or the crus link 9 can be further reduced.

Figure 6:
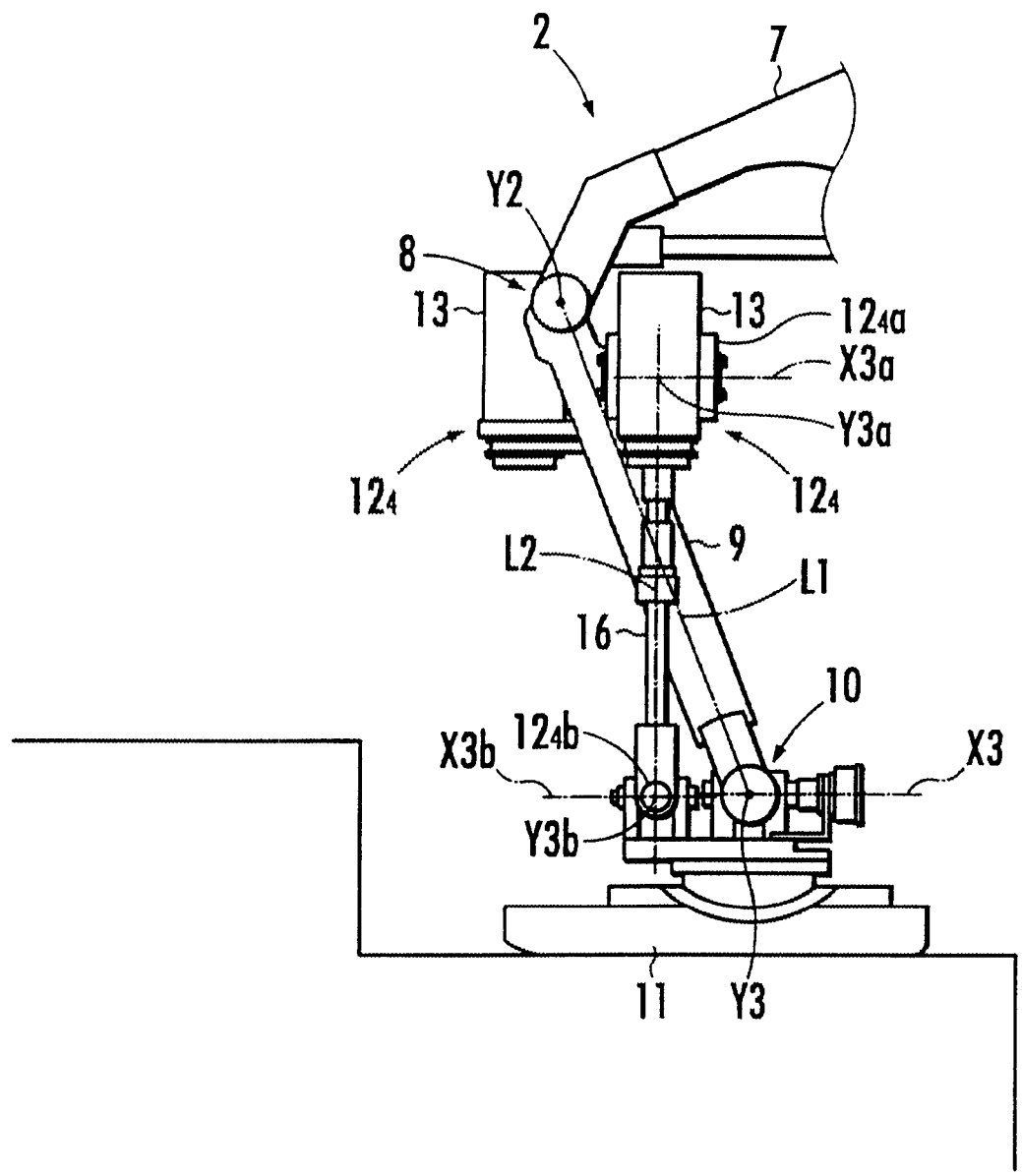
FIG. 6 is a side view illustrating a leg of the bipedal walking robot when walking upstairs to an embodiment of the present invention.

However, when walking on stairs as illustrated in FIG. 6, the flexion angle of the knee joint 8 becomes greater and the crus link 9 inclines forward greater with respect to the foot 11 stepping on the surface of a step of the stairs. Therefore, in order to go upstairs, it is necessary for the fourth linear (translatory) actuator $12_4$ to apply to the foot 11a greater moment in a direction declined forward around the ankle joint 10 (declined direction of tip toes).

Herein, among the telescopic force from the fourth linear (translatory) actuator $12_4$, it is only a component in a direction orthogonal to the foot 11 (ground surface) that contributes to the application of the moment to the foot 11. In the case where the telescopic force from the fourth linear (translatory) actuator $12_4$ is applied to the line parallel to the connection line L1 connecting the knee joint 8 and the ankle joint 10, when the robot is walking on stairs, the connection line L1, i.e., the line of action by the telescopic force, inclines forward greater with respect to the foot 11. As a result, the component of the telescopic force from the fourth linear (translatory) actuator $12_4$ is merely left acting on the direction orthogonal to the foot 11. Accordingly, it is impossible to efficiently apply a moment to the foot 11 by the fourth linear (translatory) actuator $12_4$. In order to apply a desired moment needed to climb upstairs, the fourth linear (translatory) actuator $12_4$ has to be built into a large sized one with a high output.

In regard to this problem, in the present embodiment, even if the connection line L1 connecting the knee joint 8 and the ankle joint 10 is greatly inclined forward with respect to the foot 11 when walking on stairs, the telescopic force from the fourth linear (translatory) actuator $12_4$ is applied on the line L2 inclined backward with respect to the connection line L1, therefore, the angle between the line L2 where the telescopic force is applied and the direction orthogonal to the foot 11 approximates to a right angle. Accordingly, the component of the telescopic force from the fourth linear (translatory) actuator $12_4$ orthogonal to the foot becomes greater, allowing the moment be applied to the foot 11 efficiently. As a result thereof, without adopting a large sized fourth linear (translatory) actuator $12_4$ with a high output, the desired moment needed to climb upstairs can be applied to the foot 11. Consequently, the fourth linear (translatory) actuator $12_4$ can be made compact in size and the moment of inertia of the crus link 9 can be reduced further to enable electrical power saving.

It is also possible, of course, to dispose the Y3a axis which is the connection portion of the fourth linear (translatory) actuator $12_4$ connected to the crus link 9 forward than the connection line L1 and the Y3b axis which is the connection portion of the fourth linear (translatory) actuator $12_4$ connected to the foot 11 forward than the Y3a axis, or to dispose the Y3b axis backward than the connection line L1 and the Y3a backward than the Y3b axis to enable the line where the telescopic force from the fourth linear (translatory) actuator $12_4$ is applied to be inclined backward than the connection line L1. However, this will make the fourth linear (translatory) actuator $12_4$ extend greatly to the front side or rear side of the crus link 9, deteriorating the slim looking of the leg.

In regard to this problem, by disposing the Y3a axis backward than the connection line L1 and the Y3b forward than the connection line L1 as described in the present embodiment, the extended amount of the fourth linear (translatory) actuator $12_4$ toward the anteroposterior direction of the crus link 9 becomes smaller, leading the leg 2 to become slim to make the leg 2 approximate to a profile of a human's leg.

Further in the present embodiment, effects have been made on the nut member 14 and a supporting structure thereof so as to make the driving unit 15 of each of the linear (translatory) actuators $12_1$, $12_2$, $12_3$ and $12_4$ compact in size, on which the descriptions will be given hereinafter.

As illustrated in FIG. 5, the nut member 14 has a nut body 141 for supporting the ball 14a and shafts 142 and 143 which are disposed at both ends of the nut body 141, respectively. Each of the shafts 142 and 143 has an outer diameter smaller than the nut body 141. The shafts 142 and 143 are pivotally supported by a pair of angular bearings 19 and 19, the follower pulley 14b is connected to the shaft 142 at one end in the axial direction. In the present embodiment, the shaft 142 is separate from the nut body 141 and is connected to the nut body 141 through a dog portion. However, it should be noted that the shaft 142 can be made integral to the nut body 141.

It is also possible, of course, to dispose each angular bearing 19 in such a way that an end surface of the inner track 19a of the angular bearing 19 comes into contact with a step between the nut body 141 and each shaft 142 or 143. However, this will bring about the following problem, that is, when assembling the angular bearing 19 at one end in the axial direction by fastening it toward the other angular bearing 19 at the other end in the axial direction, a fastening force will be applied to the nut body 141. As a result thereof, the ball 14a may not move smoothly due to the deformation of the nut body 141 compressed by the fastening force, leading to a greater friction.

In regard to the above problem, it may be considered to construct the nut body 141 by adding an excess thickness to the outer surface thereof so that the fastening force acts on the excess thickness. However, under this consideration, if the outer diameter of each of the shafts 142 and 143 is set at the same size as that in the present embodiment, the fastening force will acts on a portion in the nut body 141 for supporting the ball 14a. Therefore, it is necessary to increase the outer diameter of each of the shafts 142 and 143 greater than that of the nut body 141 in the present embodiment. As a result thereof, the diameter of the angular bearing 19 will become greater, and the nut case 18 for housing the angular bearing 19 will become greater in diameter consequently, which makes it difficult to make the driving unit 15 compact in size and light in weight.

To solve the above problem, the fastening force applied to the nut body 141 is prevented by configuring the shafts 142 and 143 at both ends of the nut member 14 supported by a pair of angular bearings 19 and 19 as mentioned above in the present embodiment smaller in diameter than the nut body 141 and inserting a first collar 20 which has a special shape between the inner tracks 19a and 19a of the two angular bearings 19 and 19. Specifically, the first collar 20 includes a cylindrical portion 20a and a pair of circular plate portions 20b and 20b. The cylindrical portion 20a is inserted from outside to the nut body 141. The pair of circular plate portions 20b and 20b are provided at both ends of the cylindrical portion 20a. The pair of circular plate portions 20b and 20b are embedded between an altitude difference between the nut body 141 and each of the shafts 142 and 143, and the inner track 19a of each angular bearing 19, and contacts the inner track 19a. Note that a small amount of clearance is provided between the altitude difference between the nut body 141 and each of the shafts 142 and 143, and each circular plate portion 20b. Further, if both of the circular plate portions 20b and 20b are made integral to the cylindrical portion 20a, it is impossible to fix the first collar 20 to the nut member 14; therefore, at least one of the circular plate portions 20b is configured to be detachable from the cylindrical portion 20a. In the present embodiment, both of the circular plate portions 20b and 20b are configured to be detachable from the cylindrical portion 20a.

In the present embodiment, the outer track 19b of the angular bearing 19 at one end (at the side of the mount frame 17) in the axial direction is fastened toward the other end by the mount frame 17 by fixing the mount frame 17 through a bolt to the nut case 18. Thereby, the fastening force is transmitted to the inner track 19a of the angular bearing 19 at the other end in the axial direction through bearing balls 19c and the inner track 19a of one bearing 19, the circular plate portion 20b at one end of the first collar 20, the cylindrical portion 20a of the first collar 20, and the circular plate portion 20b at the other end of the first collar 20 in the axial direction. Then, the outer track 19b of the angular bearing 19 at the other end in the axial direction is pressed to be attached to a shoulder portion 18d at the other end of the nut case 18 in the axial direction through a sealing 18e, by a pressing force transmitted from the inner track 19a of the bearing 19 at one end through the bearing balls 19c. According thereto, both of the angular bearings 19 and 19 are supported in the nut case 18, motionless in the axial direction, and a reaction force against a thrusting force applied to the nut member 14 according to the telescopic motions of each of the linear (translatory) actuators $12_1$, $12_2$, $12_3$ and $12_4$ falls on both the angular bearings 19 and 19.

As mention above, the fastening force applied to the angular bearing 19 at one end in the axial direction in the assembly is transmitted to the angular bearing 19 at the other end in the axial direction through the first collar 20, it will not act on the nut body 141. Therefore, the outer diameter of the nut body 141 can be set to a minimum size necessary for supporting the ball 14a, and the outer diameter of each of the shafts 142 and 143 can be set smaller while preventing the friction from being increased due to the smooth motion of the ball 14a impaired by the fastening force. As a result, the shafts 142 and 143 can be made small in diameter and so can the angular bearing 19. Consequently, the nut case 18 can be made small in diameter, which makes it possible to make the driving unit 15 compact in size and light in weight.

Before the outer track 19b of the angular bearing 19 at the other end in the axial direction is pressed to be fastened to a shoulder 18d at the other end of the nut case 18 in the axial direction, contacting of the mount frame 17 to one end of the nut case 18 in the axial direction will make the fastening impossible. In order to avoid the contact, a clearance is commonly provided between one end of the nut case 18 in the axial direction and the mount frame 17 by considering the size tolerance in the assembled state. However, as a result thereof, the outer track 19b of the angular bearing 19 at one end in the axial direction can be fastened in the axial direction without limitation, which exerts an excess force on the angular bearing 19, causing the friction torque to be increased possibly.

In regard to this problem, in the present embodiment, a second collar 21 which is cylindrical and has an axial length identical to that of the first collar 20 is disposed between the outer tracks 19b and 19b of both the angular bearings 19 and 19. Accordingly, the problem that the outer track 19b of the angular bearing at one end in the axial direction is excessively fastened can be prevented by the second collar 21.

However, even a difference in micrometer order between the axial lengths of the first collar 20 and the second collar 21 will exert a great effect on the force applied to the angular bearing 19. Thus, the first collar 20 and the second collar 21 are manufactured to have the exact same axial length by surface grinding the first collar 20 and the second collar 21 simultaneously after setting the two collars on a jig 100 as illustrated in FIG. 7.

Figure 7:
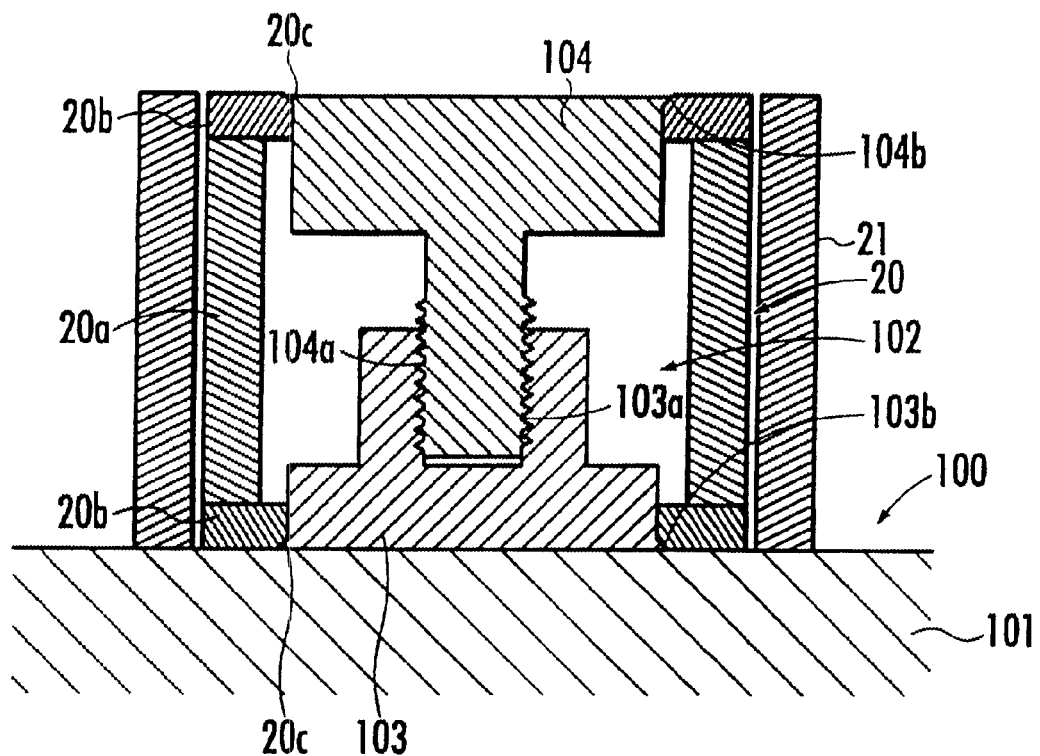
FIG. 7 is a sectional view illustrating a surface grinding state of a first collar and a second collar disposed in a nut case which is provided in a linear (translatory) actuator mounted on the bipedal walking robot according to an embodiment of the present invention.

As illustrated in FIG. 7, an inner circumferential portion, facing outward in the axial direction, of each circular plate portion 20b of the first collar 20 is formed with a taper portion 20c inclined inward in the axial direction and facing inward in the radius direction. The jig 100 includes a jig main body 101 and a pressing jig 102. The pressing jig 102 is detachably mounted to the jig main body 101 through a magnetic chuck or the like, and is constituted of a lower half portion 103 having a female thread portion 103a and an upper half portion 104 having a male thread portion 104a. An outer circumferential surface at the end of the lower half portion 103 is disposed with a taper portion 103b corresponding to the taper portion 20c disposed in each circular plate portion 20b of the first collar 20. Similarly, an outer circumferential surface at the end of the upper half portion, 104 is disposed with a taper portion 104b corresponding to the taper portion 20c disposed in each circular plate portion 20b of the first collar 20.

When undergoing the surface grinding, one of the circular plate portions 20b of the first collar 20 is located on the jig main body 101 so that the taper portion 20c thereof is engaged to the taper portion 103b of the lower half portion 103 of the pressing jig 102; on the top thereof, there are placed with the cylindrical portion 20a of the first collar 20 and the other circular plate portion 20b. Thereafter, the upper half portion 104 of the pressing jig 102 is screwed to the lower half portion 103. Accordingly, the taper portion 104b of the upper half portion 104 is engaged to the taper portion 20c of the other circular plate portion 20*b*, thereby, the first collar 20, composed of one circular plate portion 20*b*, the cylindrical portion 20*a* and the other circular plate portion 20*b*, is sandwiched between the lower half portion 103 and the upper half portion 104 and is fixed on the jig main body 101. Subsequently, the second collar 21 is located on the jig main body 101 so as to enclose the first collar 20. Therefore, the upper surface of the circular plate 20*b* upper in the first collar 20 and the upper end surface of the second collar 21 can undergo surface grinding simultaneously.

Therefore, the taper portion 20*c* formed at the circular plate portion 20*b* functions as an engaging portion to the pressing jig 102, which makes possible the simultaneous surface grinding for the first collar 20 and the second collar 21. In the present embodiment, the taper portion 20*c* is formed at both the circular plate portions 20*b* and 20*b* of the first collar 20. It is acceptable to form the taper portion 20*c* at the upper circular plate portion 20*b* which undergoes the surface grinding and the taper portion 104*b* at the upper half portion 104 of the pressing jig 102 only as long as the lower half portion 103 of the pressing jig 102 is strongly fixed at the jig main body 101.

Although the embodiment of the present invention is described in the above with reference to the drawings, the present invention is not limited thereto. For example, in the above-mentioned embodiment, the connection portion (Y2*a* axis), which is connected to the thigh link 7, of the driving unit 15 of the third linear (translatory) actuator $12_3$ for driving the crus link, or the connection portion (Y3*a*), which is connected to the crus link 9, of the driving unit 15 of the fourth linear (translatory) actuator $12_4$ for driving the foot is disposed at a distance away from the hip joint 6 or the knee joint 8; it is acceptable to connect the driving unit 15 of the third linear (translatory) actuator $12_3$ to the thigh link 7 in a way that it can rock freely around the same axial line as the joint axis (Y1 axis) of the hip joint 6 and connect the driving unit 15 of the fourth linear (translatory) actuator $12_4$ to the crus link 9 in a way that it can rock freely around the same axial line as the joint axis (Y2 axis) of the knee joint 8. According thereto, the moment of inertia around the hip joint 6 of the thigh link 7 and the moment of inertia around the knee joint 8 of the crus link 9 can be further reduced.

Moreover, in the above-mentioned embodiment, the ankle joint 10 is configured as a 2-axis joint which can rock along the vertical direction and the lateral direction of the foot 11; it is possible to configure the ankle joint 10 as a single-axis joint which can rock only along the vertical direction of the foot 11. In this situation, the fourth linear (translatory) actuator $12_4$ for driving the foot may be a single one.

What is claimed is:

1. A bipedal walking robot comprising a body and a pair of legs at both sides of the body, wherein each leg is composed of a thigh link connected to the body through a hip joint, a crus link connected to a lower end of the thigh link through a knee joint, and a foot connected to a lower end of the crus link through an ankle joint, the bipedal walking robot further comprising a foot driving linear actuator configured to exert a linear telescopic force through a telescopic motion thereof, the foot driving linear actuator connecting the crus link and the foot of each leg away from the ankle joint, and to drive the foot to rock around the ankle joint with respect to the crus link by applying the linear telescopic force through the telescopic motion thereof;

wherein the foot driving linear actuator is disposed in such a way that the linear telescopic force therefrom acts on a line inclined backward with respect to a connection line connecting the knee joint and the ankle joint.

2. The bipedal walking robot according to claim 1, wherein a crus link connection portion, which connects the foot driving linear actuator to the crus link, is disposed in a backward direction relative to the connection line, and a foot connection portion, which connects the foot driving linear actuator to the foot, is disposed in a forward direction relative to the connection line, said forward direction being opposite to said backward direction.

3. A bipedal walking robot comprising a body and a pair of legs at both sides of the body, wherein each leg is composed of a thigh link connected to the body through a hip joint, a crus link connected to a lower end of the thigh link through a knee joint, and a foot connected to a lower end of the crus link through an ankle joint, the bipedal walking robot further comprising a foot driving linear actuator, which connects the crus link and the foot of each leg away from the ankle joint, for driving the foot to rock around the ankle joint with respect to the crus link according to a telescopic motion thereof;

wherein the foot driving linear actuator is disposed in such a way that a telescopic force therefrom acts on a line inclined backward with respect to a connection line connecting the knee joint and the ankle joint, wherein a crus link connection portion, which connects the foot driving linear actuator to the crus link, is disposed backward than the connection line, and a foot connection portion, which connects the foot driving linear actuator to the foot, is disposed forward than the connection line, and wherein the foot driving linear actuator includes a ball screw mechanism composed of a driving unit having an electrical motor and a nut member driven to rotate by the electrical motor, and a screw shaft screwed to the nut member through a ball supported by the nut member; the crus link connection portion is disposed in the driving unit and the foot connection portion is disposed at a lower end of the screw shaft.

4. A bipedal walking robot comprising a body and a pair of legs at both sides of the body, wherein each leg is composed of a thigh link connected to the body through a hip joint, a crus link connected to a lower end of the thigh link through a knee joint, and a foot connected to a lower end of the crus link through an ankle joint, the bipedal walking robot further comprising a foot driving linear actuator, which connects the crus link and the foot of each leg away from the ankle joint, for driving the foot to rock around the ankle joint with respect to the crus link according to a telescopic motion thereof, and a crus driving linear actuator, which connects the thigh link and the crus link of each leg away from the knee joint, for driving the crus to rock around the knee joint with respect to the thigh link according to a telescopic motion of the linear actuator, in addition to the foot driving linear actuator, wherein the foot driving linear actuator is disposed in such a way that a telescopic force therefrom acts on a line inclined backward with respect to a connection line connecting the knee joint and the ankle joint, wherein each of the foot driving linear actuator and the crus driving linear actuator includes a ball screw mechanism composed of a driving unit having an electrical motor and a nut member driven to rotate by the electrical motor, and a screw shaft screwed to the nut member through a ball supported by the nut member;

the driving unit of the crus driving linear actuator is rockably connected to the thigh link and the screw shaft thereof is rockably connected to the crus link;

the driving unit of the foot driving linear actuator is rockably connected to the crus link and the screw shaft thereof is rockably connected to the foot;

a rocking axis of the driving unit of the crus driving linear actuator with respect to the thigh link is orthogonal to a central axis of the nut member of the driving unit; and a rocking axis of the driving unit of the foot driving linear actuator with respect to the crus link is orthogonal to a central axis of the nut member of the driving unit.

5. The bipedal walking robot according to claim 4, wherein the driving unit of each of the linear actuators is provided with a mount frame for mounting thereon the electrical motor and a nut case for rockably housing the nut member; the nut case and the electrical motor are disposed in parallel on the mount frame, and the driving unit is rockably connected to the thigh link or the crus link around the rocking axis in the nut case.

6. The bipedal walking robot according to claim 5, wherein the driving unit of the crus driving linear actuator is rockably connected to the thigh link with the rocking axis thereof identical to a joint axis of the hip joint, and the driving unit of the foot driving linear actuator is rockably connected to the crus link with the rocking axis thereof identical to a joint axis of the knee joint.

7. The bipedal walking robot according to claim 4, wherein the driving unit of the crus driving linear actuator is rockably connected to the thigh link with the rocking axis thereof identical to a joint axis of the hip joint, and the driving unit of the foot driving linear actuator is rockably connected to the crus link with the rocking axis thereof identical to a joint axis of the knee joint.

* * * * *